Figure 4:
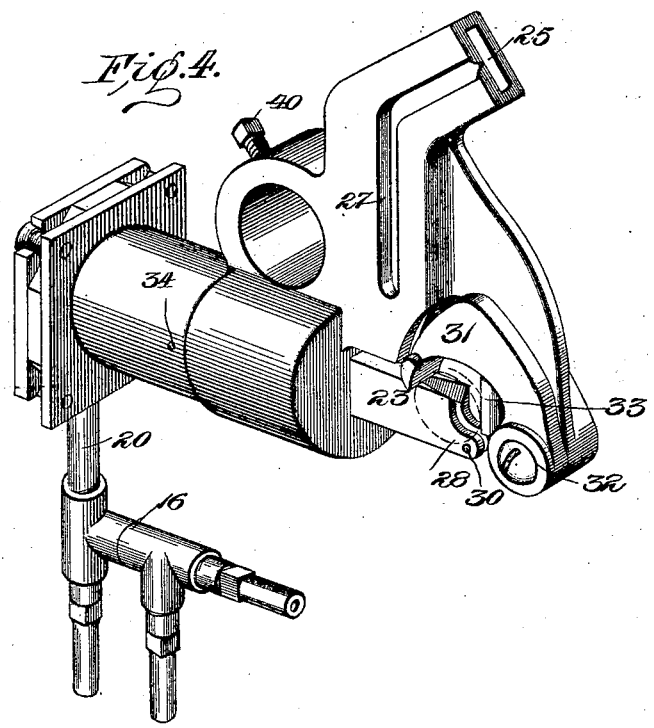

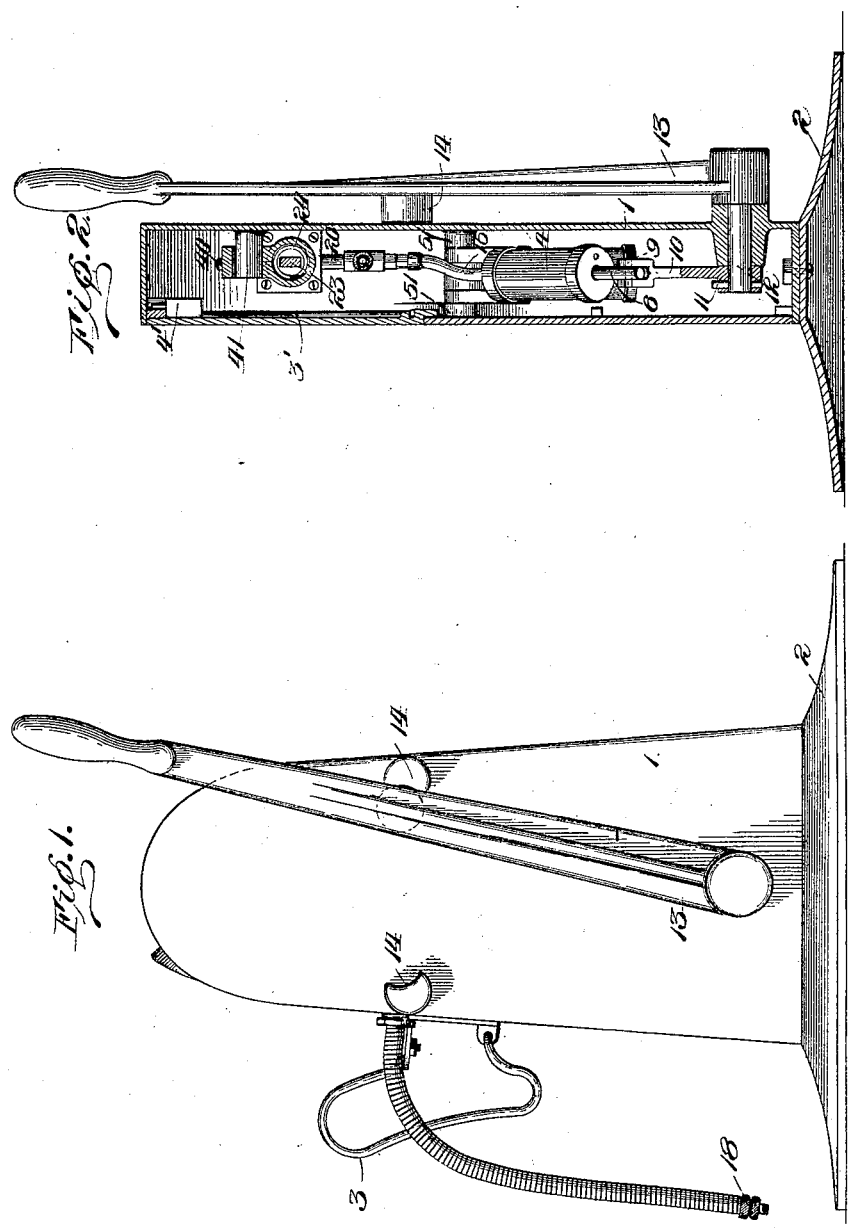

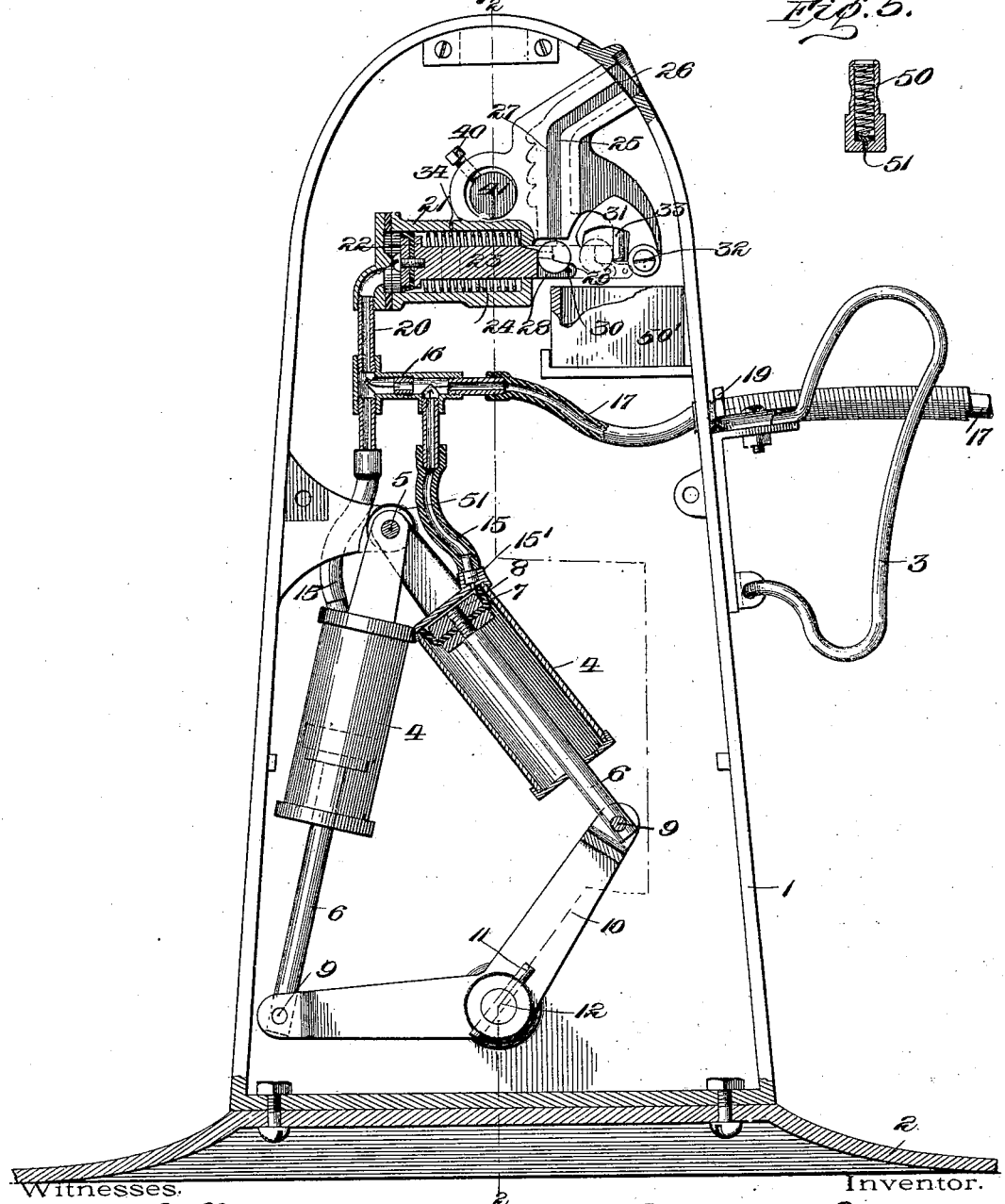

No. 631,802. Patented Aug. 29, 1899.
C. A. MACY.
COIN CONTROLLED BICYCLE PUMP
(Application filed Apr. 26, 1899.)
(No Model.) 3 Sheets—Sheet 3.

Witnesses. Inventor.
Walter B. Payne. Clarence A. Macy
G. Willard Rich. by C. Dunsha Church
                  his Attorneys

THE NORRIS PETERS CO., PHOTO-LITHO., WASHINGTON, D. C.

UNITED STATES PATENT OFFICE.

CLARENCE A. MACY, OF ROCHESTER, NEW YORK, ASSIGNOR TO GEORGE A. BEACHEM, OF HOLLEY, NEW YORK.

COIN-CONTROLLED BICYCLE-PUMP.

SPECIFICATION forming part of Letters Patent No. 631,802, dated August 29, 1899.

Application filed April 26, 1899. Serial No. 714,556. (No model.)

*To all whom it may concern:*

Be it known that I, CLARENCE A. MACY, of Rochester, in the county of Monroe and State of New York, have invented certain new and useful Improvements in Coin-Controlled Bicycle-Pumps; and I do hereby declare the following to be a full, clear, and exact description of the same, reference being had to the accompanying drawings, forming a part of this specification, and to the reference-numerals marked thereon.

My present invention has for its object to provide a pump for inflating pneumatic bicycle-tires with air under pressure and one adapted particularly for public use which is controlled in its operation by the insertion of a coin.

To this end my invention consists in certain improvements and combinations of parts, all as will be hereinafter described, and the novel features pointed out in the claims at the end of this specification.

In the drawings, Figure 1 is a side elevation of the device constructed in accordance with my invention; Fig. 2, a longitudinal sectional view on the line 2 2 of Fig. 3; Fig. 3, a transverse sectional view; Fig. 4, a detail perspective view of the controlling mechanism; Fig. 5, a sectional view of a check-valve.

Similar reference-numerals in the several figures indicate similar parts.

The pump mechanism is inclosed in a casing or housing 1, supported upon a base 2, flaring outward at the sides and ends, as shown, forming a firm support and preventing the device from being easily moved or tilted during operation. Arranged upon one side of the casing and at a convenient elevation is a bicycle holder or support 3, which may be of any preferred construction, adapted to engage with either the forward or rear wheel of the bicycle and to support the latter while the tire is being inflated. 3' indicates a door in the casing permitting access to the controlling mechanism normally secured by a lock 4'.

In order to supply the air under constant and steady pressure so that the controlling mechanism, to be presently described, may not be released through any unsteadiness in the operation after the coin has been deposited and also to obviate the necessity of a reservoir intermediate said mechanism, I employ two oscillatory cylinders (indicated at 4) journaled at one end upon a pin 5 between the studs 51 on the casing. The cylinders are each provided with the piston-rod 6, having the head embodying the usual cup-packing 7, of leather or other similar material, secured by the locking-nuts 8. The pistons are adapted to be operated alternately in their respective cylinders and are connected upon their outer ends by pivots 9 to a bell-crank lever 10, secured by a pin 11 or otherwise to a short shaft 12, journaled in a boss on the casing side and provided upon its outer extremity with an operating-handle 13, operating between lugs or stops 14, arranged to limit its movement according to the length of the cylinders.

15 indicates tubing or flexible pipe connections leading from the upper end of each pump-cylinder to the supply-pipe 16, which latter is provided with the flexible extension 17, leading through the casing and provided upon its extremity with the coupling 18, adapted to be attached to the valve of the tire. The portion outside the casing is protected from wear or other damage by an incompressible flexible covering, consisting in the present instance of a closely-wound spiral spring, as shown in Figs. 1 and 3, attached at its inner end to a nipple 19, threaded into the casing. Check-valves 15' are arranged, in connection with the apertures leading from the ends of the pump-cylinders, to prevent the return of air to the cylinders upon the outward movement of the piston-heads, and in the present instance consists of the shell or casing having the enlarged central aperture containing the coil-spring 50 and the smaller passage 51, leading therefrom and normally closed by a packing-disk held in position by the spring, as shown particularly in Fig. 5. A pipe 20 connects the air-supply pipe 16 with a cylinder 21, having the piston-head 22 and rod 23 operating therein and adapted to be operated in one direction by a coil-spring 24, arranged within the casing.

Just above the outer end of the piston is a coin-channel 25, leading to an aperture 26 in the casing and open upon one side for access, as at 27, and having its further edge provided with notches or corrugations, as shown in dotted lines, to prevent tampering with the device by the insertion of a wire or other means, said corrugations preventing the ready introduction of said wire.

The piston-rod 23 is preferably prevented from rotating by making it rectangular in cross-section, and its outer end is bifurcated beneath the coin-channel, forming the fingers 28 and the shoulder 29, between which and a pin 30 the coin is supported, said parts forming a coin-support.

31 indicates a gravitating hook pivoted at 32 and arranged to engage with the periphery of the coin when the piston-rod 23 is operated to move the latter beneath the hook and into engagement with a stop or shoulder 33, which limits the rearward movement of the piston, holding the head 22 thereof over an escape port or aperture 34 in the cylinder, as shown in dotted lines in Fig. 3.

The upper portions of the fingers 28 are cut away, allowing their lower portions, which form extensions thereof, to pass beneath the stop 33 when there is no coin in the coin-support, thereby permitting the piston-head to be moved by the pressure of air from the pumps until the aperture 34 is opened, when the air from the cylinders will be allowed to escape into the casing without producing sufficient pressure of air in the supply-pipe to be available. By this arrangement I am enabled to provide a very simple and compact device, and by forming the coin-channel integral with the cylinder and its coöperating parts the whole may be fitted up, as shown in Fig. 4, and is adapted to be secured by a single screw 40 to a lug 41, arranged within the casing.

The operation will now be easily understood. The operator places his bicycle with one of the wheels thereof in engagement with the holder 3, then connects the flexible supply-pipe 17 with the tire-valve by means of the union 18. The coin having been inserted through the aperture 26 in the casing passes down the channel 25 and falls into the coin-support formed by the fingers 28 and pin 30. The pump-handle 13 is now oscillated between the stops 14, reciprocating the pistons 6 in their respective cylinders, the latter oscillating upon their common pivot 5. The air compressed at each inward stroke of the pistons passes from the cylinders by the piping 15 to the pipe 16, leading to the bicycle-tire, and also to the cylinder 21, moving the piston-head 22 rearwardly against the tension of spring 24 until over the escape-port 34, when its movement is arrested by the engagement of the coin in the coin-holder with the stop 33, in which position it is maintained as long as the air-pressure is sufficient to overcome the tension of the spring 24, thereby allowing the tire to become filled with air. Upon disconnecting the supply-tube from the bicycle-tire the air-pressure is reduced, allowing the return of the piston 23 to normal position, Fig. 3, and in moving backward beneath the hook 31 the latter engaging with the periphery of the coin removes it from the coin-holder and allows it to fall into a suitable coin-receptacle 50', arranged beneath. It will be noted that the coin itself forms a movable stop for limiting the movement of the escape valve or piston and thereby holding the pressure.

I claim as my invention—

1. In a coin-controlled mechanism, the combination with an air-supply, of a supply-pipe having an escape-port normally closed, an automatic valve adapted to open said port and controlled to hold the latter closed by the deposit of a coin.

2. In a coin-controlled air-pump, the combination with a pump-cylinder having the piston, of a supply-pipe leading from the cylinder and having an escape-port, and an automatic coin-controlled valve coöperating therewith.

3. The combination with an air-pump and a pipe connected therewith and having an escape port or aperture, a valve coöperating with said port and actuated in one direction by air-pressure, the position of said valve being controlled by a coin.

4. The combination with an air-pump and a pipe connected therewith and having an escape port or aperture, a valve normally covering said port and adapted to be removed therefrom by air-pressure in the pipe, and means for holding a coin in position to prevent the movement of said valve to open the port.

5. The combination with an air-pump and a pipe connected therewith and having an escape port or aperture, a valve controlling said port, and operated by air-pressure in the pipe, and means for holding a coin in position to regulate the movement of said valve.

6. The combination with an air-pump, and a pipe connected therewith, and having an escape port or aperture, a valve operated by air-pressure in the pipe and coöperating with said escape-port, a coin-holder, and a stop coöperating with a coin in the holder to limit the movement of the valve.

7. The combination with an air-pump, and a pipe connected therewith, and having an escape port or aperture, a valve actuated by pressure in the pipe to open the escape-port, and means for holding a coin in a position to limit the movement of said valve.

8. The combination with an air-pipe having a discharge-orifice and an escape port or aperture, a valve actuated by pressure in the pipe to open said escape-port, and means for controlling the movement of said valve by a coin.

9. The combination with an air-pump, an air-pipe having a discharge-orifice, and an escape port or aperture, a valve for controlling said escape-port operated by pressure in the pipe, and means for holding a movable stop in position to limit the movement of the valve.

10. The combination with an air-pump, an air-discharge pipe having an escape port or aperture, a movable valve for controlling said port and operated by air-pressure in the pipe to open it, a coin-holder, and a stop with which a coin in the holder coöperates to limit the movement of the valve.

11. The combination with an air-pump, an air-discharge pipe having an escape port or aperture, a movable valve operated by pressure in the pipe and having a coin-support thereon, a stop with which a coin on the support engages to limit the movement of the valve, and means for removing the coin from the support when operated in one direction.

12. In a coin-controlled air-pump, the combination with the casing, a double-acting air-pump therein, and a handle for operating it arranged outside of the casing, a discharge-pipe leading from the pump to the exterior of the casing, having an escape port or aperture, a spring-operated valve normally closing said port and operated by air-pressure to open it, and means for retaining a coin in position to limit the movement of the valve.

13. The combination with a pump, a discharge-pipe therefor, having an escape port or aperture, a valve operated by fluid-pressure in the pipe to open the escape-port, said valve being adapted to coöperate with a movable part which limits its movement.

14. In an air-pump, the combination with the pump-cylinder, of a pipe leading therefrom, and connected to a cylinder having an escape-port, an automatically-operated piston in the cylinder adapted to open said port by air-pressure from the pump and means for holding the piston to close the port upon the insertion of a coin.

15. In a coin-controlling mechanism for air-pumps, the combination with the pump, of a cylinder connected thereto provided with an escape-port and having the automatic piston operated in one direction by air-pressure, a coin-support connected to the piston and adapted, when a coin is deposited therein, to coöperate with a stop to limit the movement of the piston and hold said port closed.

16. In a coin-controlling mechanism for air-pumps, the combination with the pump, of a cylinder connected thereto and provided with an escape-port, the automatic piston operated by air-pressure in one direction, a coin-support connected to the piston and adapted when a coin is placed therein to limit the movement of the piston and hold the escape-aperture closed during the operation of the pump.

17. In a coin-controlling mechanism for air-pumps, the combination with the pump, of a cylinder connected thereto and having a piston provided with a coin-support adapted to be operated automatically in one direction by air-pressure to move the coin, a removing device adapted to engage the coin and remove the latter from the support.

18. In a coin-controlling mechanism for air-pumps, the combination with a pump, of a cylinder connected thereto and provided with an escape-port, a piston operating in the cylinder to close said port, and provided with a coin-support, a coin-channel arranged above the latter and formed integral with the cylinder.

19. In an air-pump, the combination with a casing, of the pump-cylinders pivoted within the casing and having their pistons pivoted upon opposite ends of an oscillating lever-arm, a handle connected to said arm and arranged without the casing, and a discharge-pipe leading from the pump, to the exterior of the casing and connected with a coin-controlled valve mechanism.

CLARENCE A. MACY.

Witnesses:
G. WILLARD RICH,
G. A. RODA.